United States Patent
Eastwood et al.

(10) Patent No.: US 10,288,289 B2
(45) Date of Patent: May 14, 2019

(54) GAS TURBINE ENGINE DIFFUSER-COMBUSTOR ASSEMBLY INNER CASING

(71) Applicant: UNITED TECHNOLOGIES CORPORATION, Farmington, CT (US)

(72) Inventors: Jonathan Jeffery Eastwood, Newington, CT (US); Dave J. Hyland, Portland, CT (US); Timothy Dale, Manchester, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 193 days.

(21) Appl. No.: 14/930,757

(22) Filed: Nov. 3, 2015

(65) Prior Publication Data
US 2016/0169514 A1    Jun. 16, 2016

Related U.S. Application Data

(60) Provisional application No. 62/091,129, filed on Dec. 12, 2014.

(51) Int. Cl.
| | |
|---|---|
| *F01D 9/04* | (2006.01) |
| *F23R 3/00* | (2006.01) |
| *F01D 9/02* | (2006.01) |
| *F01D 25/24* | (2006.01) |
| *F02C 7/20* | (2006.01) |
| *F23R 3/04* | (2006.01) |
| *F23R 3/10* | (2006.01) |

(52) U.S. Cl.
CPC ............. *F23R 3/002* (2013.01); *F01D 9/023* (2013.01); *F01D 9/041* (2013.01); *F01D 9/042* (2013.01); *F01D 9/047* (2013.01); *F01D 25/24* (2013.01); *F02C 7/20* (2013.01); *F23R 3/04* (2013.01); *F23R 3/10* (2013.01); *Y02T 50/671* (2013.01)

(58) Field of Classification Search
CPC . F23R 3/04; F01D 9/041; F01D 9/047; F01D 9/04; F01D 9/042; F01D 9/023
See application file for complete search history.

(56) References Cited

U.S. PATENT DOCUMENTS

| | | | |
|---|---|---|---|
| 4,483,149 A | * | 11/1984 | Rider ..................... F01D 25/16 60/751 |
| 4,503,668 A | | 3/1985 | Duncan, III et al. |
| | | (Continued) | |

FOREIGN PATENT DOCUMENTS

| | | |
|---|---|---|
| GB | 2120326 A | 11/1983 |
| WO | 2013188722 A1 | 12/2013 |
| WO | 2014134513 A1 | 9/2014 |

OTHER PUBLICATIONS

European Search Report for Application No. 15198724.5-1607; dated May 6, 2016; 7 pgs.

*Primary Examiner* — Steven M Sutherland
(74) *Attorney, Agent, or Firm* — Cantor Colburn LLP

(57) ABSTRACT

An inner casing for a diffuser-combustor assembly of a gas turbine engine is disclosed. The inner casing may include an outer-ring, an inner-ring circumscribed by the outer-ring, and a strut having a body extending between the inner-ring and the outer-ring. In addition, the inner casing may include a reinforcing-pad.

12 Claims, 7 Drawing Sheets

(56) References Cited

U.S. PATENT DOCUMENTS

| | | | | |
|---|---|---|---|---|
| 5,077,967 A * | 1/1992 | Widener | ............... | F04D 29/541 |
| | | | | 415/208.1 |
| 5,224,819 A * | 7/1993 | Kernon | ................... | F01D 9/041 |
| | | | | 415/115 |
| 5,285,630 A * | 2/1994 | Ansart | ..................... | F23R 3/04 |
| | | | | 60/39.23 |
| 6,513,330 B1 * | 2/2003 | Rice | ..................... | F04D 29/542 |
| | | | | 60/751 |
| 6,554,569 B2 * | 4/2003 | Decker | .................. | F01D 5/141 |
| | | | | 415/192 |
| 2007/0271924 A1 * | 11/2007 | Daguenet | ............... | F01D 9/041 |
| | | | | 60/751 |

* cited by examiner

GAS TURBINE ENGINE DIFFUSER-COMBUSTOR ASSEMBLY INNER CASING

CROSS REFERENCE TO RELATED APPLICATIONS

This application is a non-provisional application claiming the 35 U.S.C. § 119(e) benefit of U.S. Provisional Patent Application No. 62/091,129 filed on Dec. 12, 2014.

FIELD OF THE DISCLOSURE

This disclosure generally relates to gas turbine engines and, more specifically, relates to an inner casing of a diffuser-combustor assembly for a gas turbine engine.

BACKGROUND OF THE DISCLOSURE

Gas turbine engines are well known internal combustion engines typically used to provide thrust to an aircraft or to provide power for land-based operations. Generally speaking, a gas turbine engine includes a fan, a compressor, a combustor and a turbine arranged in a serial fashion along a longitudinal axis of an engine. The fan draws in ambient air as it rotates and moves it to the compressor where the air is compressed or pressurized. The compressed air is then communicated to the combustor where it is mixed with fuel and ignited. The products of the combustion are hot gases which are then directed into the turbine. This causes the airfoils in the turbine to rotate, and as the turbine is mounted on the same shaft, or shafts, as the compressor and fan, this causes the compressor and fan to rotate too. Accordingly, once started, it can be seen that the operation of the engine is self-sustaining in that the combustion of more fuel with air causes more rotation of the turbine and in turn the compressor and the fan. Moreover, the rotation of the fan, which typically has a diameter many times that of the compressor and the turbine, causes the engine to generate thrust.

In order to increase operational efficiency, and thereby decrease fuel consumption, new gas turbine engine designs require a diffuser-combustor assembly to further include a pre-diffuser that is positioned between an exit of the high-pressure compressor and the entrance to the combustor. One means to provide such a pre-diffuser is to create a strut that extends between an inner-ring and an outer-ring of an inner casing of the diffuser-combustor assembly.

However, such a strut design is not without problem since such a strut is positioned in the flowpath of the hot, compressed air that exits the high-pressure compressor. As such, the temperature of the hot, compressed air exiting the compressor may not be equal along an axis extending between the inner and outer-ring of the inner casing, and thus also along a radial axis of the strut that extends between the inner-ring and outer-ring of the inner casing. Thus, the strut may experience a differing expansion or contraction rate than the inner and outer-rings. Thus, a need exists to counteract such ring-strut-ring thermal fighting of a strut pre-diffuser design.

SUMMARY OF THE DISCLOSURE

In accordance with one aspect of the present disclosure, an inner casing of a diffuser-combustor assembly is disclosed. The inner casing may include an outer-ring, an inner-ring circumscribed by the outer-ring and a strut having a body extending between the inner-ring and the outer-ring. The inner casing may further include a reinforcing-pad.

In a refinement of the inner casing of the diffuser-combustor assembly, the inner casing may be located downstream of a high-pressure compressor, and the reinforcing-pad may be located outside of a stream of hot, compressed air flowing through the inner casing from the high-pressure compressor.

In another refinement of the inner casing of the diffuser-combustor assembly, the reinforcing-pad may be circumferentially aligned with the strut on an inner-side of the inner-ring.

In another refinement of the inner casing of the diffuser-combustor assembly, the inner casing may further comprise a plurality of struts and more than one reinforcing-pad.

In another refinement of the inner casing of the diffuser-combustor assembly, the number of struts may equal the number of reinforcing-pads, and each of the reinforcing-pads may be circumferentially aligned with one of the struts on an inner-side of the inner-ring.

In another refinement of the inner casing of the diffuser-combustor assembly the number of reinforcing-pads may be less than the number of struts, and each of the reinforcing-pads may be circumferentially aligned with one of the struts on an inner-side of the inner-ring.

In another refinement of the inner casing of the diffuser-combustor assembly, the reinforcing-pad may further comprise a body having a thickness between about 0.110 inches and 0.200 inches.

In another refinement of the inner casing of the diffuser-combustor assembly, the reinforcing-pad may further comprise a circumferential width between a left side and a right side between about 1.000 inches and 2.000 inches.

In another refinement of the inner casing of the diffuser-combustor assembly, the outer-ring, inner-ring, strut and reinforcing-pad may be made of a material selected from the group consisting of aluminum, titanium, nickel, aluminum alloys, steel and nickel alloys.

In accordance with another aspect of the present disclosure, a gas turbine engine is disclosed. The gas turbine engine may comprise a high-pressure compressor and a diffuser-combustor assembly in fluid communication with the high pressure compressor. The diffuser-combustor assembly may have an inner casing and the inner casing may comprise an outer-ring, an inner-ring circumscribed by the outer-ring, a strut having a body extending between the inner-ring and the outer ring and a reinforcing pad.

In a refinement of the gas turbine engine, the diffuser-combustor assembly may be located downstream of the high-pressure compressor, and the reinforcing-pad may be located outside of a stream of hot, compressed air flowing through the inner casing from the high-pressure compressor.

In another refinement of the gas turbine engine, the reinforcing-pad may be circumferentially aligned with the strut on an inner-side of the inner-ring.

In another refinement of the gas turbine engine, the inner casing may further comprise a plurality of struts and more than one reinforcing-pad.

In another refinement of the gas turbine engine, the number of struts may equal the number of reinforcing-pads an each of the reinforcing-pads may be circumferentially aligned with one of the struts on an inner-side of the inner-ring.

In another refinement of the gas turbine engine, the number of reinforcing-pads may be less than the number of struts and each of the reinforcing-pads may be circumferentially aligned with one of the struts on an inner-side of the inner-ring.

In another refinement of the gas turbine engine, the reinforcing-pad may further comprise a body having a thickness between about 0.110 inches and 0.200 inches.

In another refinement of the gas turbine engine, the reinforcing-pad may further comprise a circumferential width between a left side and a right side between about 1.000 inches and 2.000 inches.

In another refinement of the gas turbine engine, inner casing may be made of a material selected from the group consisting of aluminum, titanium, nickel, aluminum alloys, steel and nickel alloys.

In accordance with another aspect of the present disclosure, a method of operating a gas turbine engine including a diffuser-combustor assembly having an inner casing with a pre-diffuser is disclosed. The method may include the first step of expelling compressed air from a high-pressure compressor, followed by the step of passing the compressed air past a strut of the pre-diffuser. Next, the method may include the step of sending a portion of the air passing the pre-diffuser to a combustor, and the inner casing may further comprise a reinforcing-pad circumferentially aligned with the strut.

These and other aspects and features of the present disclosure will be more readily understood when read in conjunction with the accompanying drawings.

DETAILED DESCRIPTION OF THE DISCLOSURE

Figure 1:
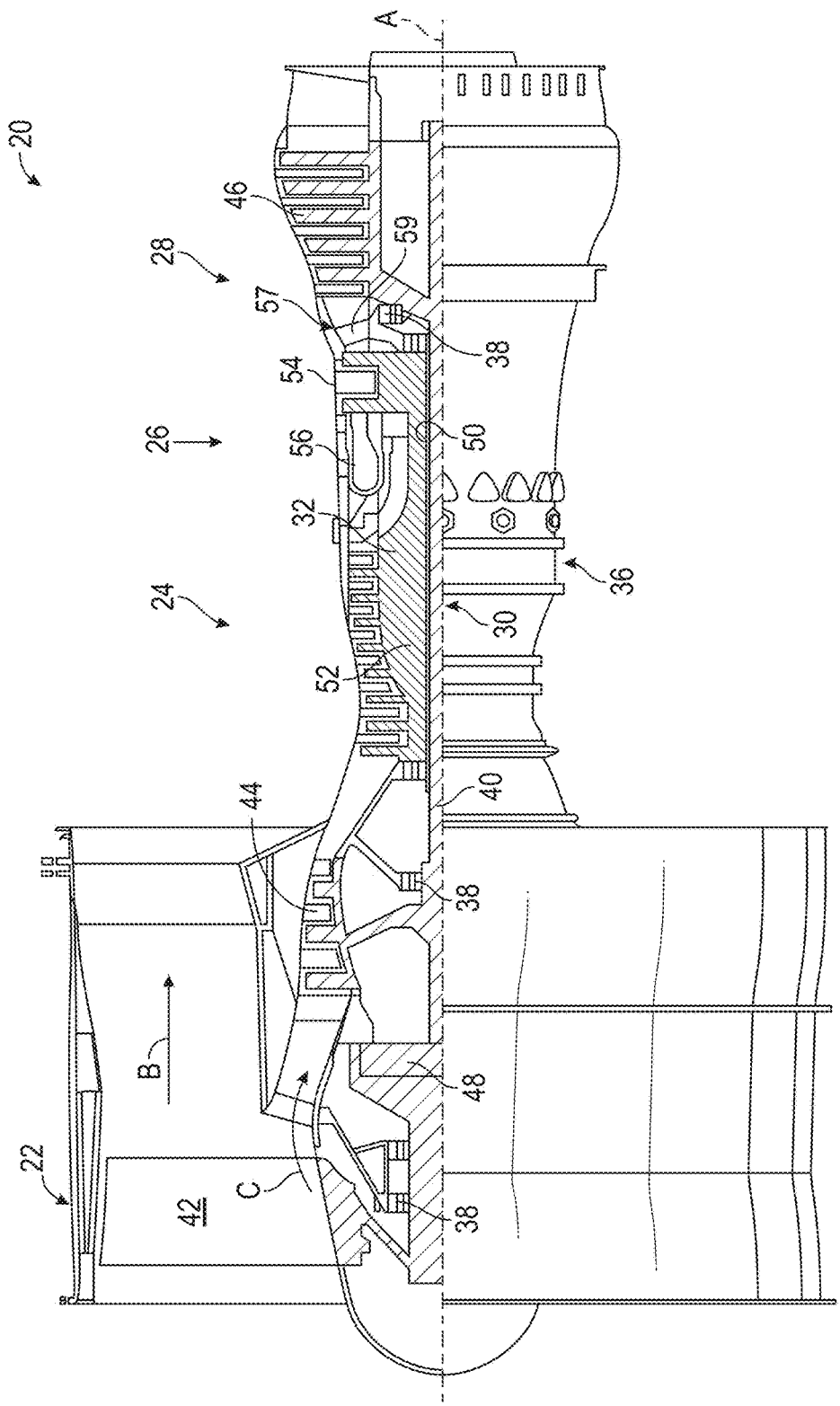
FIG. 1 is a side, partially cross-sectional view of an embodiment of a gas turbine engine constructed in accordance with the present disclosure.

Referring now to the drawings, and with specific reference to FIG. 1, a gas turbine engine is shown and generally referred to be reference numeral 20. The gas turbine engine 20 disclosed herein is a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath B, while the compressor section 24 drives air along a core flowpath C for compression and communication into the combustor section 26. As will be described in further detail herein, in the combustion section 26, the compressor air is mixed with fuel and ignited, with the resulting combustion gases then expanding in turbine section 28. Although depicted as a two-spool turbofan gas turbine engine in the disclosed non-limiting embodiment, it should be understood that the concepts described herein are not limited to use with turbofans as the teachings may be applied to other types of turbine engines including, but not limited to, three-spool architectures as well.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan blade assembly 42, a low pressure (or first) compressor section 44 and a low pressure (or first) turbine section 46. The inner shaft 40 is connected to the fan blade assembly 42 through a geared architecture 48 to drive the fan assembly 42 at a lower speed than the low speed spool 30. The high speed spool 32 includes an outer shaft 50 that interconnects a high pressure (or second) compressor section 52 and high pressure (or second) turbine section 54. The outer shaft 50 is typically concentric with and radially outward from the inner shaft 50. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 supports one or more bearing systems 38 in the turbine section 28. The inner shaft 40 and the outer shaft 50 are concentric and rotate via bearing systems 38 about the engine central longitudinal axis A, which is collinear with their longitudinal axes. As used herein, a "high pressure" compressor or turbine experiences a higher pressure than a corresponding "low pressure" compressor or turbine.

The core airflow C is compressed first by the low-pressure compressor 44, and then by the high pressure compressor 52, before being mixed and burned with fuel in the combustor 56, and lastly expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example is a high-bypass geared aircraft engine. In a high-bypass engine a greater volume of air moves along a bypass flowpath B than through core airflow C. The ratio of the mass of air moving through bypass flowpath B to core airflow C is known as the bypass ratio. In one example, the engine 20 bypass ratio may be greater than about six (6), while in another example the bypass ratio may be greater than ten (10), the geared architecture 48 may be an epicyclic gear train, such as a star gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low-pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans.

Figure 2:
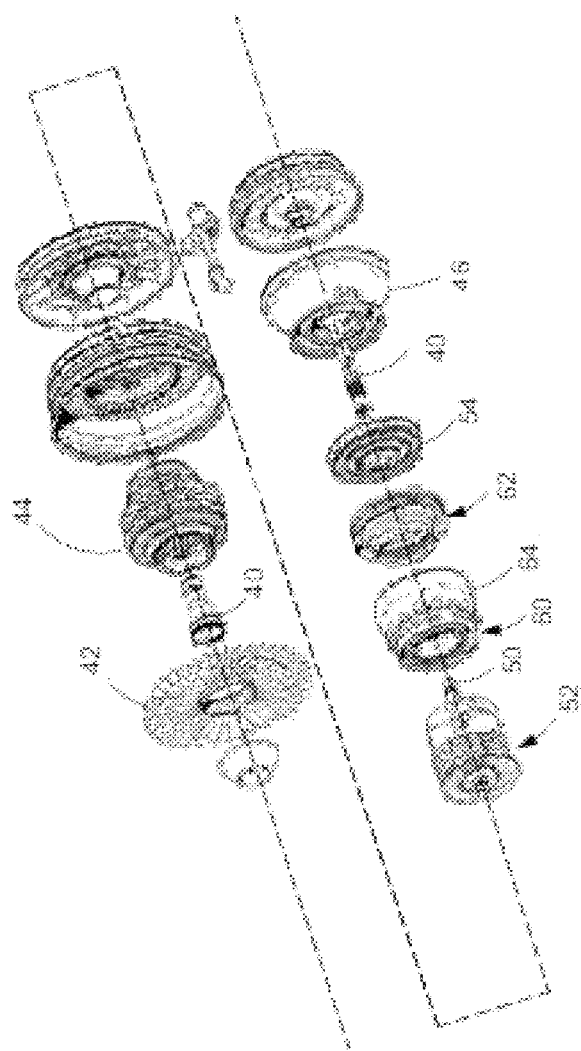
FIG. 2 is an exploded view of some major assemblies of an embodiment of a gas turbine engine, including a diffuser-combustor assembly manufactured in accordance with the present disclosure.

Now turning to FIG. 2, the combustor 56 may be part of a diffuser-combustor assembly 60, and this assembly 60 may be located between the high pressure compressor 52 and a turbine nozzle 62. The diffuser-combustor assembly 60 may include an inner casing (not shown in FIG. 2) and an outer casing 64 that circumscribes the inner casing. The combustor 56 may be secured between the inner casing and outer casing 64 of the diffuser-combustor assembly.

Figure 3:
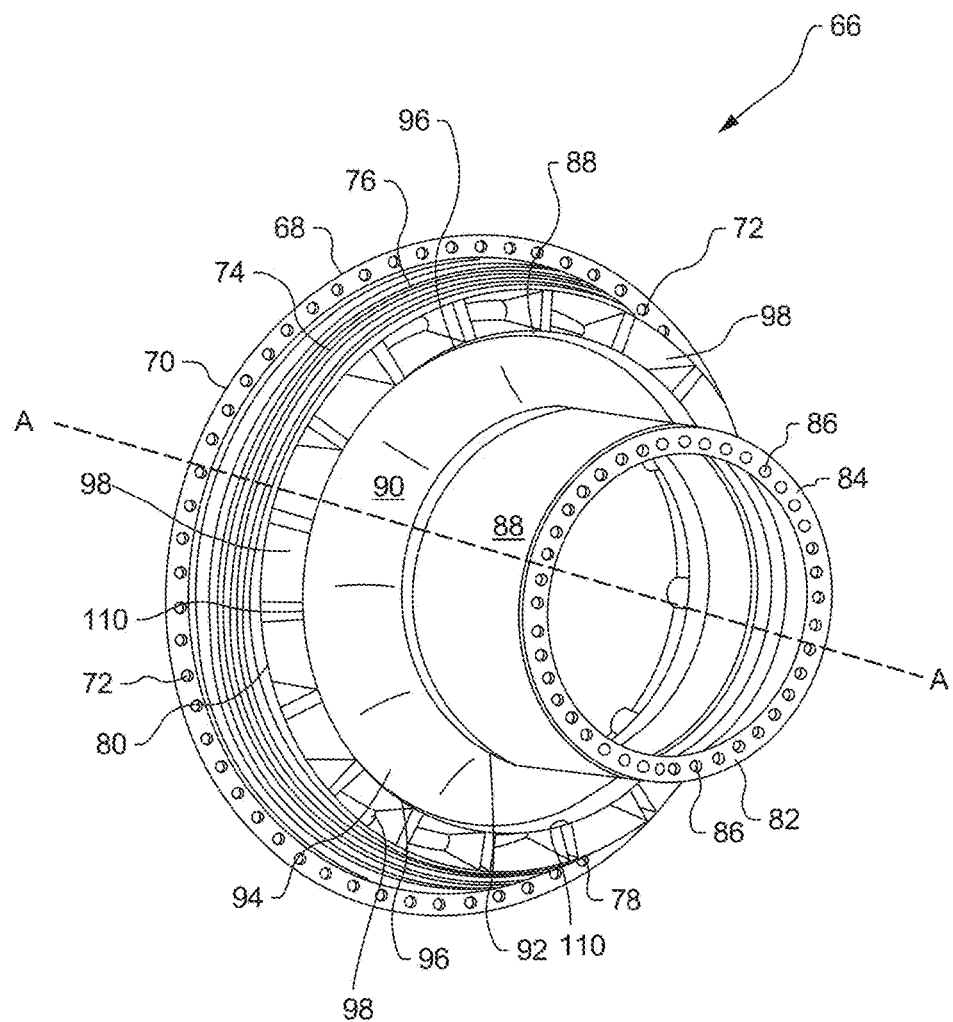
FIG. 3 is a partially side, perspective view of an embodiment of an inner casing of diffuser-combustor assembly comprising a strut manufactured in accordance with the present disclosure.

Now looking to FIGS. 2-3, an inner casing 66 of a gas turbine engine 20 manufactured in accordance with the present disclosure is depicted. As shown there, the inner casing 66 may include an outer-flange 68 having a circular shape located at its forward end 70. The outer-flange 68 may further include a plurality of holes 72 therethrough for securing the forward end 70 of the inner casing 66 to the high pressure compressor 52. In addition, the inner casing 66 may further include a cone 74 having a cone-body 76 that extends aftward from the flange 70. Positioned inside this cone-body 74, the casing may further comprise an outer-ring 78 having a circular shape that follows an inside edge 80 of the cone 74.

While still referring to FIGS. 2-3, the inner casing 66 may further comprise an inner-flange 82 having a circular shape located at its tail end 84. Furthermore, the inner-flange 82 may include a plurality of holes 86 therethrough for securing the inner casing 66 to the turbine nozzle 62. Located fore of the inner-flange 82, the inner casing 66 may further comprise a circularly shaped tube 88 that extends between the inner-flange and a coupler 90 located fore of the tube. The coupler 90 may have an inside diameter 92 and an outside diameter 94, and the body of the coupler 90 may extend between the inside diameter 92 and the outside diameter 94 at an oblique angle relative to the longitudinal axis A of the gas turbine engine 20. Additionally, the inner casing 66 may include an inner-ring 96 that circumscribes the outside diameter 94 of the coupler, but is itself circumscribed by the outer-ring 78. Moreover, the inner casing 66 may further include a pre-diffuser 98 located between the inner-ring 96 and outer-ring 78.

Figure 4:
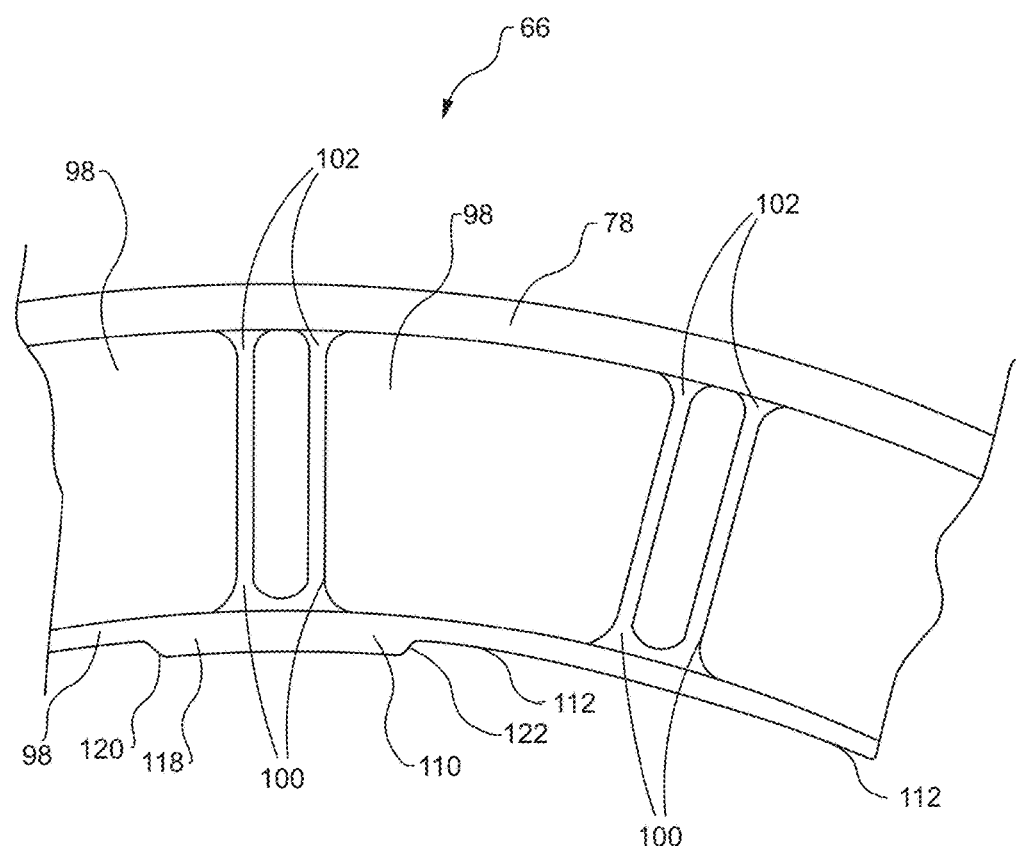
FIG. 4 is a partial view of the inner casing of FIG. 3 comprising a pre-diffuser manufactured in accordance with the present disclosure looking from aft to fore.
Figure 5:
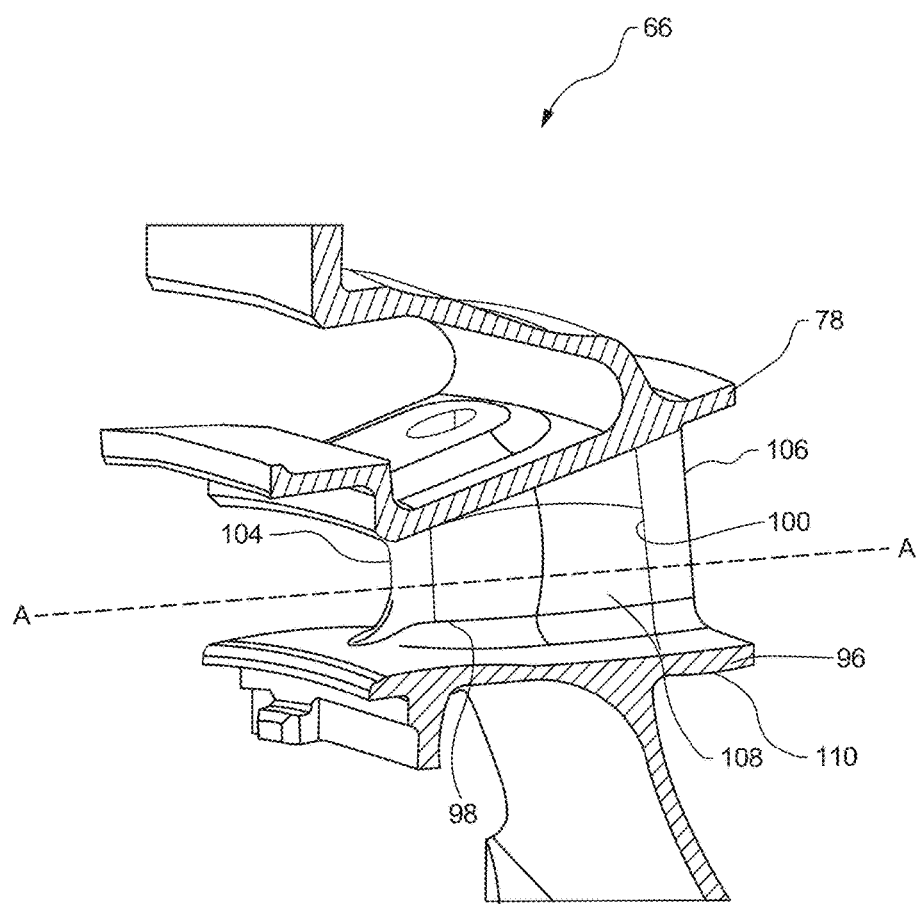
FIG. 5 is a partially side, perspective view of an inner casing of FIG. 3 comprising a pre-diffuser manufactured in accordance with the present disclosure looking from a fore to aft.
Figure 6:
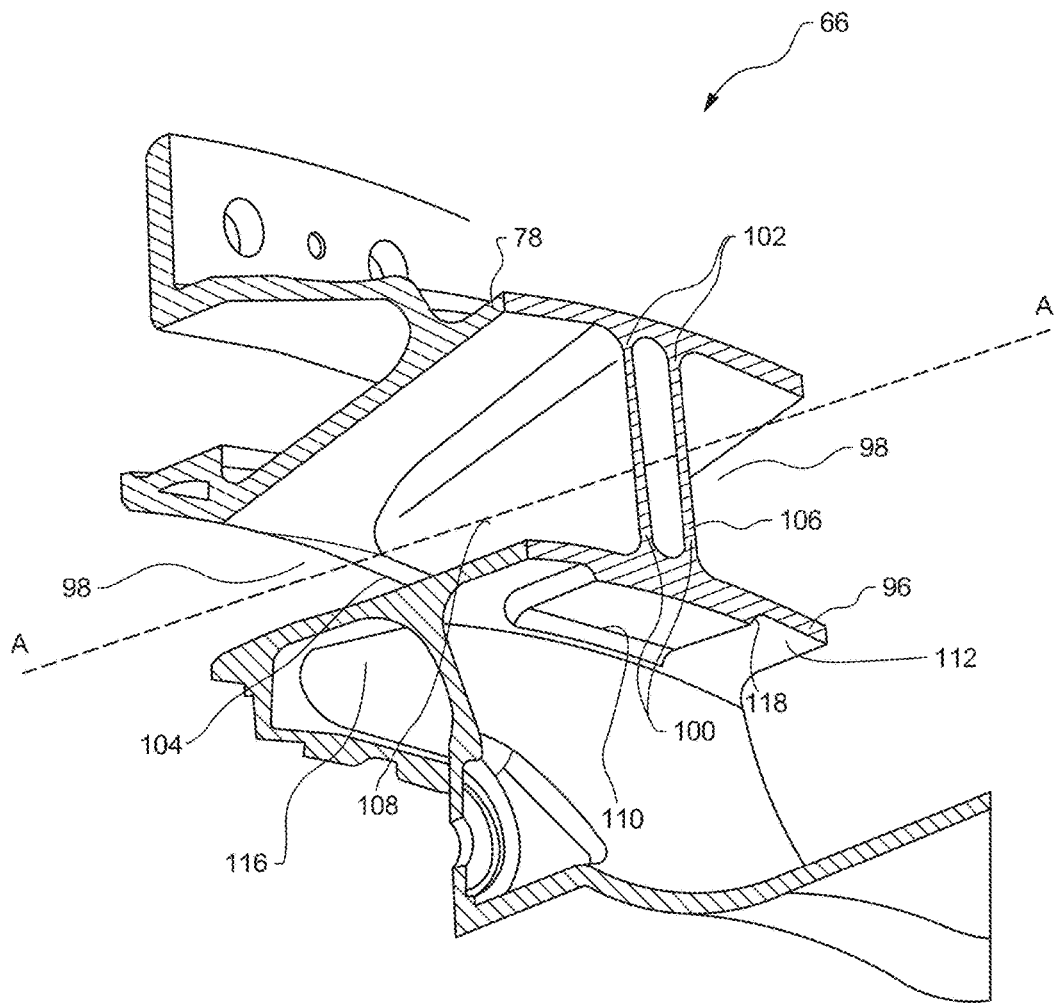
FIG. 6 is a partially side, perspective view of an inner casing of FIG. 3 comprising a pre-diffuser manufactured in accordance with the present disclosure looking from aft to fore.

Now with reference to FIG. 4, an aft to forward looking view of the pre-diffuser 98 manufactured in accordance with the present disclosure is depicted. As seen there, the pre-diffuser 98 may be defined in a radial direction by the space between the outer-ring 78 and the inner-ring 96. Furthermore, the pre-diffuser 98 may be defined in a circumferential direction by the space between adjacent struts 100 that divides the pre-diffuser 98 into sub-sections. Thus, each sub-section of the pre-diffuser 98 may be defined by the space bounded between adjacent struts 100, and between the outer-ring 68 and inner-ring 96. As will be noted in this aft to fore looking view in FIG. 4, each strut 100 may comprise a pair of tail ends 102 on the aft side of each strut 100. Now turning to FIGS. 5-6, differing perspective views of the pre-diffuser 98 manufactured in accordance with the present disclosure are illustrated. As seen there, the pre-diffuser 98 may be defined along the longitudinal axis A of the engine 20 between a fore-side 104 and a tail-side 106 of each strut 100.

Now while reviewing each of FIGS. 3-6, it can be seen that each strut 100 may be a design, having a body 108 that extends between the outer-ring 78 and inner-ring 96. Furthermore, the body 108 of this strut 100 may extend in the longitudinal direction A between the fore-side 104 and the tail-side 106 of each strut. Furthermore, each strut 100 may taper in the longitudinal direction between a thin fore-side 104 and a thicker tail-side 106 so that the air transferring from the high-pressure compressor meets a thin leading edge fore-side 104 of the strut 100 that eventually moved past a thicker tail-side 106 profile of the strut 100.

The inner casing 66 described may be manufactured from a metal or a metal alloy such as through processes including casting, forging or near-net forging. While not meant to be all inclusive, the metals from which the inner casing 66 may be manufactured include aluminum, titanium and nickel. Some examples of metal alloys that may be utilized to form the inner casing 66 include aluminum alloys, steel, nickel alloys and titanium alloys, such as series 2000, 6000 or 7000 aluminum, 300 and 400 series stainless steels, precipitation hardenable stainless steels, Ti-6Al-4V, Ti-6Al-2Sn-4Zr-2Mo, WASPALOY®, INCONEL 718®, INCONEL 718+®, INCONEL 939®, HAYNES 282® or PWA 1471-3. As will be understood by a person designing the inner casing 66, what metal or metal alloy to use may be dependent on the temperatures to which this hot section of the gas turbine engine 20 will be exposed.

Furthermore, in one instance of the inner casing 66 manufactured in accordance with the present disclosure, the number of struts 100 may be greater than or equal to three and less than or equal to one hundred. In another instance, the number of struts 100 may be greater than or equal to twelve and less than or equal to twenty-five. In a further instance the number of struts 100 may be greater than or equal to fourteen and less than or equal to twenty. In a further instance, the number of struts 100 may be greater than or equal to sixteen and less than or equal eighteen. In a further instance, the number of struts 100 may be sixteen. In another instance, the number of struts 100 may be eighteen. As will be noted, a person designing such an inner casing 66 will pick the number of struts 100 based on the overall flowrate of air exiting the high-pressure compressor during operation and match it with the flow characteristics of the combustor 56 for a particular engine 20.

In operation, it can be seen that such a strut 100 is positioned in the flowpath of the hot, compressed air that exits the high-pressure compressor 52. As such, and as can be envisioned when reviewing FIG. 5, the temperature of the hot, compressed air exiting the high-pressure compressor 52 may not be equal along fore-side 104 of strut 100, therefore leading to differing rates of contraction or expansion of the strut 100 in comparison to the inner and outer-rings 96,78. This differing rate of expansion and contraction may lead to ring-strut-ring thermal fighting of such a strut 100 pre-diffuser 98 design. Furthermore, as can further be envisioned by reviewing FIG. 5, since this strut 100 is placed in the flowpath of the hot, compressed air exiting the high-pressure compressor 52, it is also tasked with converting a radial flow component of the air exiting the high-pressure compressor 52 to an axial flow direction. As such, the strut 100 must be able to withstand the torque imposed upon it while converting the air flow component directions. However, as a continuing goal of gas turbine engine 20 design is to decrease engine weight, such a strut 100 design must be able to undertake the ring-strut-ring thermal fighting and imposed torque on the strut 100 with minimal additional weight added to the inner casing 66.

While reviewing FIGS. 3-6, it can be seen that a means to resolve these issues may be to add mass to the struts 100 so that each strut 100 is further thickened between its fore-side 104 and tail side 106. However, this thickening would decrease the cross-sectional area of the flowpath of hot, compressed air exiting the high-pressure compressor 52, thereby leading to less pressure drop across such space. Therefore, as can be seen in FIGS. 3-6, a reinforcing-pad 110 may be added to resolve the afore-described issues.

While still reviewing FIGS. 3-6, the reinforcing-pad 110 may further be located on the inner-side 112 of the inner-ring 96 circumferentially aligned with a strut 100, and out of the flowpath of the hot, compressed air exiting the high-pressure compressor 52. Furthermore, this reinforcing-pad 110 may comprise a body 114 that extends between a first end 116 and a second end 118 along the longitudinal axis of the inner casing 66. Moreover, the body 114 may be defined in the circumferential direction as having a left-side 120 and a right side 122, and additionally having a thickness in a radial direction. In one embodiment, the reinforcing-pad 110 is made of the same material as the inner casing 66 described above. In an alternative embodiment, the reinforcing-pad 110 is made of a second material. In this instance, the reinforcing-pad 110 may be made of different metal or metal alloy than the rest of the inner casing 66. Some examples of different metals and metal alloys from which the reinforcing-pad 110 may be made include, but are not meant to be limited to, aluminum, titanium, nickel, aluminum alloys such as series 2000, 6000 or 7000 aluminum, steel such as 300 and 400 series stainless steels or precipitation hardenable stainless steels and nickel alloys or titanium alloys such as Ti-6Al-4V, Ti-6Al-2Sn-4Zr-2Mo, WASPALOY®, INCONEL 718®, INCONEL 718+®, INCONEL 939®, HAYNES 282® or PWA 1471-3.

In one instance, the number of reinforcing-pads 110 may be equal to the number struts 100. In another instance the number of reinforcing-pads 110 may be less than the number of struts 100 such that less than every strut is associated with a reinforcing-pad 110. Furthermore, in one instance the thickness of the reinforcing-pad 110 is greater than or equal to 0.100 inches, and less than or equal to 0.200 inches. In another instance, the thickness of the reinforcing-pad 110 is greater than or equal to 0.125 inches and less than or equal to 0.175. In a further instance, the thickness of the reinforcing-pad 110 is about 0.164 inches. Moreover, the circumferential width between the left side 120 and right side 122 of each reinforcing-pad 110 may be greater than or equal to 1.000 inches and less than or equal to 2.00 inches. In a further instance, the circumferential width between the left side 120 and the right side 122 of the reinforcing-pad 110 may be greater than or equal to 1.100 inches and less than or equal 1.25 inches. In a further embodiment, the circumferential width between the left side 120 and right side 122 of the reinforcing-pad 110 may be about 1.116 inches. In a further embodiment, the circumferential width between the left side 120 and right side 122 may be about 1.196 inches.

Figure 7:
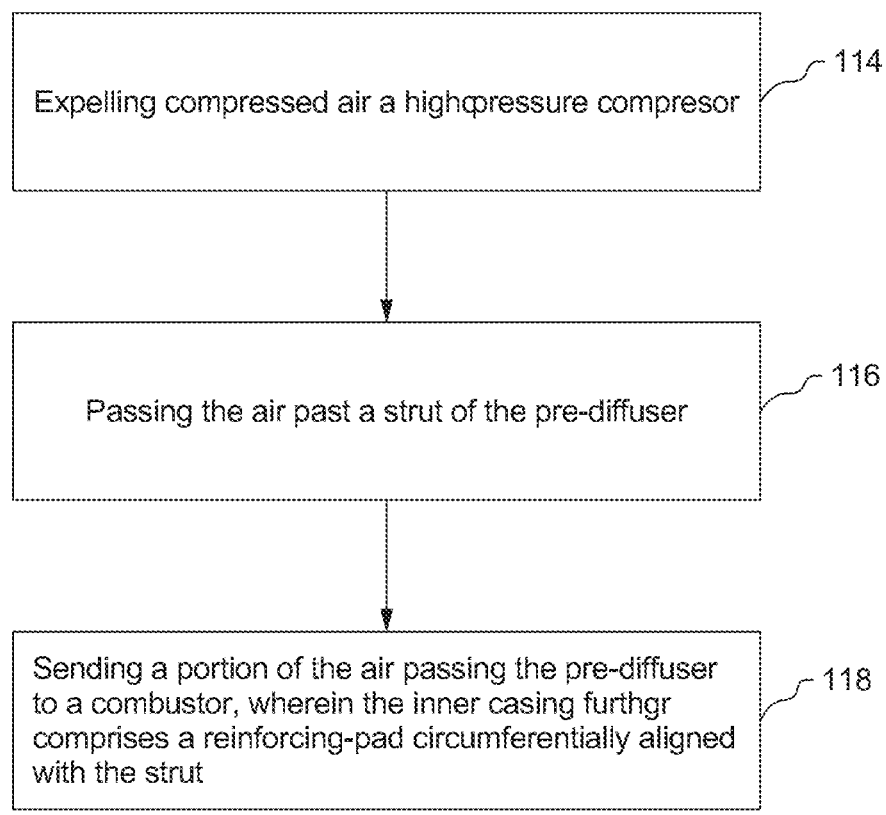
FIG. 7 is a flowchart depicting a sample sequence of steps which may be practiced in accordance with an embodiment of a method of operating a gas turbine engine manufactured in accordance with the present disclosure.

While the foregoing describes a gas turbine engine 20, and an inner casing 66 with a pre-diffuser 98 and reinforcing-pad 110 located on the inner-side 112 of the inner-ring 96 under the strut 100, the present disclosure also describes a method of operating a gas turbine engine including a diffuser-combustor assembly having an inner casing with a pre-diffuser. An embodiment of these methods is depicted in the flowchart in FIG. 7. As can be see there, the method may include the first step 114 of expelling air from a high-pressure compressor. In a next step 116, the air may be past a strut of the pre-diffuser. In a last step 118, a portion of the air passing the pre-diffuser may be sent to a combustor. In addition, the inner casing of this method may further comprise a reinforcing-pad circumferentially aligned with the strut.

INDUSTRIAL APPLICABILITY

In operation, an inner casing of a diffuser-combustor assembly reinforcing can find use in many industrial settings, including but not limited to, in a gas turbine engine. More specifically, various inner casings are disclosed having an outer-ring, an inner-ring circumscribed by the outer-ring, and a strut having a body extending between the inner-ring and the outer-ring. In addition, the inner casing may include a reinforcing-pad. The reinforcing-pad may be circumferentially aligned with the strut.

It can be seen that such a strut is positioned in the flowpath of the hot, compressed air that exits an upstream high-pressure compressor. As such, the temperature of the hot, compressed air exiting the compressor may not be equal along a fore-side of strut, which leads to differing rates of contraction or expansion of the strut along its fore-side when compared to the inner and outer-rings. This differing rate of expansion and contraction leads to ring-strut-ring thermal fighting of such a strut pre-diffuser design. Furthermore, since this strut is placed in the flowpath of the hot, compressed air exiting the high-pressure compressor, it is also tasked with converting a radial flow component of the air exiting the compressor to an axial flow component. As such, the strut must be able to withstand the torque imposed upon it while converting the air flow component directions. A reinforcing-pad placed on an inner-side of the inner-ring of the inner casing, and in circumferential alignment with the strut, provides the inner casing with the resilience it needs to handle the torque forces imposed on it from the upstream compressor and also helps to distribute the unequal heat profile impinging the fore-side of the strut.

The above description is meant to be representative only, and thus modifications may be made to the embodiments described herein without departing from the scope of the disclosure. Thus, these modifications fall within the scope of present disclosure and are intended to fall within the appended claims.

What is claimed is:

1. An inner casing of a diffuser-combustor assembly, comprising:
   an outer-ring;
   an inner-ring circumscribed by the outer-ring, the inner-ring being located radially inward of the outer ring relative to an engine central longitudinal axis;
   a strut having a body extending between the inner-ring and the outer-ring; and
   a reinforcing-pad, located on an inner-side of the inner-ring and circumferentially aligned with the strut such that the reinforcing-pad provides support and reinforcement to the strut, the reinforcing-pad having a thickness extending away from the inner-side of the inner-ring in a radially inward direction relative to the engine central longitudinal axis,
   wherein the reinforcing-pad is defined in a circumferential direction as having a left side and a right side,
   wherein the reinforcing-pad is wide in the circumferential direction than the strut.

2. The inner casing according to claim 1, wherein the inner casing is located downstream of a high-pressure compressor, and the reinforcing-pad is located outside of a stream of hot, compressed air flowing through the inner casing from the high-pressure compressor.

3. The inner casing according to claim 1, wherein the reinforcing-pad further comprises a body having a thickness between 0.110 inches and 0.200 inches.

4. The inner casing according to claim 1, wherein the reinforcing-pad further comprises a circumferential width between the left side and the right side between 1.000 inches and 2.000 inches.

5. The inner casing according to claim 1, wherein the outer-ring, inner-ring, strut and reinforcing-pad are made of a material selected from a group consisting of aluminum, titanium, nickel, aluminum alloys, steel and nickel alloys.

6. The inner casing according to claim 1, wherein the strut has a pair of tail ends located proximate a tail-side of the strut.

7. A gas turbine engine, comprising:
a high-pressure compressor; and
a diffuser-combustor assembly in fluid communication with the high pressure compressor, the diffuser-combustor assembly having an inner casing, the inner casing comprising:
an outer-ring;
an inner-ring circumscribed by the outer-ring, the inner-ring being located radially inward of the outer ring relative to an engine central longitudinal axis;
a strut having a body extending between the inner-ring and the outer-ring; and
a reinforcing-pad, located on an inner-side of the inner-ring and circumferentially aligned with the strut such that the reinforcing-pad provides support and reinforcement to the strut, the reinforcing-pad having a thickness extending away from the inner-side of the inner-ring in a radially inward direction relative to the engine central longitudinal axis,
wherein the reinforcing-pad is defined in a circumferential direction as having a left side and a right side,
wherein the reinforcing-pad is wider in the circumferential direction than the strut.

8. The gas turbine engine according to claim 7, wherein the diffuser-combustor assembly is located downstream of the high-pressure compressor, and the reinforcing-pad is located outside of a stream of hot, compressed air flowing through the inner casing from the high-pressure compressor.

9. The gas turbine engine according to claim 7, wherein the reinforcing-pad further comprises a body having a thickness between 0.110 inches and 0.200 inches.

10. The gas turbine engine according to claim 7, wherein the reinforcing-pad further comprises a circumferential width between the left side and the right side between 1.000 inches and 2.000 inches.

11. The gas turbine engine according to claim 7, wherein the inner casing is made of a material selected from a group consisting of aluminum, titanium, nickel, aluminum alloys, steel and nickel alloys.

12. A method of operating a gas turbine engine, the gas turbine engine including a diffuser-combustor assembly having an inner casing with a pre-diffuser, comprising the steps:
expelling compressed air from a high-pressure compressor;
passing the compressed air past a strut of the pre-diffuser; and
sending a portion of the compressed air passing the pre-diffuser to a combustor,
wherein the inner casing further comprises a reinforcing-pad circumferentially aligned with the strut,
wherein the inner casing further comprises a plurality of struts and more than one reinforcing-pad,
wherein a number of reinforcing-pads is less than a number of struts, and
wherein each of the reinforcing-pads is circumferentially aligned with one of the struts on an inner-side of the inner-ring.

* * * * *